(12) United States Patent
Baccay et al.

(10) Patent No.: US 8,868,051 B2
(45) Date of Patent: Oct. 21, 2014

(54) METHOD AND USER INTERFACE FOR FACILITATING CONFERENCE CALLS

(75) Inventors: Peter Eymard Baccay, San Jose, CA (US); Christina Evelyn Lucey, San Francisco, CA (US); Irina Mikheyenok, Castro Valley, CA (US)

(73) Assignee: BlackBerry Limited, Waterloo, Ontario (CA)

( * ) Notice: Subject to any disclaimer, the term of this patent is extended or adjusted under 35 U.S.C. 154(b) by 351 days.

(21) Appl. No.: 13/310,678

(22) Filed: Dec. 2, 2011

(65) Prior Publication Data

US 2013/0143539 A1 Jun. 6, 2013

(51) Int. Cl.
*H04M 3/42* (2006.01)

(52) U.S. Cl.
USPC ........ 455/416; 455/414.1; 455/466; 455/518; 455/412.1; 370/260; 370/338; 709/205; 709/204

(58) Field of Classification Search
CPC ....... H04M 3/56; H04M 3/565; H04M 3/382; H04M 1/72566; H04M 2203/2072; H04M 2250/62; H04M 15/09; H04M 2203/5009; H04M 2203/5054; H04M 2203/5063; H04M 2203/652; H04M 2207/12; H04M 3/42229; H04M 3/4382
USPC ........... 455/416, 414.1, 566, 415, 518, 412.2, 455/418, 419; 370/260, 338; 709/205, 204
See application file for complete search history.

(56) References Cited

U.S. PATENT DOCUMENTS

| | | | |
|---|---|---|---|
| 6,871,064 B1 * | 3/2005 | Holt et al. | 455/414.1 |
| 7,532,232 B2 | 5/2009 | Shah et al. | |
| 7,975,242 B2 | 7/2011 | Forstall et al. | |
| 2003/0231746 A1 * | 12/2003 | Hunter et al. | 379/88.01 |
| 2004/0131167 A1 * | 7/2004 | Chang et al. | 379/202.01 |
| 2004/0218744 A1 * | 11/2004 | Nguyen et al. | 379/202.01 |
| 2010/0162153 A1 | 6/2010 | Lau | |
| 2010/0208625 A1 * | 8/2010 | Logan et al. | 370/260 |
| 2010/0272245 A1 | 10/2010 | Brunson | |
| 2011/0150199 A1 | 6/2011 | Gisby et al. | |
| 2011/0182415 A1 | 7/2011 | Jacobstein et al. | |
| 2011/0212714 A1 | 9/2011 | Lobzakov et al. | |
| 2011/0267985 A1 | 11/2011 | Wilkinson et al. | |

FOREIGN PATENT DOCUMENTS

EP 2237533 A1 10/2010

OTHER PUBLICATIONS

Extended European Search Report dated Mar. 22, 2013, for European Patent Application No. 12159599.5.

* cited by examiner

*Primary Examiner* — Quan M Hua
(74) *Attorney, Agent, or Firm* — Finnegan, Henderson, Farabow, Garrett & Dunner, LLP (57) ABSTRACT

Presented are systems and methods for presenting conference call information using a mobile conferencing system. The mobile conferencing system classifies a call type parameter as a conference call based on conference details. The mobile conferencing system joins a mobile device to a teleconference using the conference details and the call type parameter. The mobile conferencing system then displays an active call graphical user interface, wherein the graphical user interface displays at least part of the conference details.

20 Claims, 6 Drawing Sheets

METHOD AND USER INTERFACE FOR FACILITATING CONFERENCE CALLS

FIELD

Example embodiments relate to conferencing systems and methods.

BACKGROUND

Mobile devices, such as cellular phones and smart phones, are increasingly used to participate in conference calls. Depending on the device and, typically, the software being used on the device, calendaring software can be used to track an impending conference call, such as by storing dial-in information (a conference call number and often an access code) with the calendar entry. In some cases, calendaring software also can provide the dial-in information to a telephone application on the device, when the conference call is about to start. Such calendaring software can provide an alert or a question on a user interface of the device giving the user an option to join the conference. Although helpful, a variety of further enhancements to the user interface of mobile devices and their usability for conference calling and for other activities remain.

BRIEF DESCRIPTION OF THE DRAWINGS

Reference will now be made to the accompanying drawings showing example embodiments of the present application, and in which.

DESCRIPTION OF EXAMPLE EMBODIMENTS

The example embodiments provided below describe a mobile conferencing system, such as a conference call system, that allows graphical user interfaces (GUI) operating on a mobile device to display enhanced conference information. Enhanced conference information includes for example, conference details parsed from a calendar event and icons indicating that a call is a conference call. The mobile conferencing system can interface with an existing calendar application and an existing dialer application associated with a mobile device. The mobile conferencing system parses a calendar event to extract conference details and classify a call type parameter associated with the calendar event as a "conference call" based on the conference details. Conference details can include, for example, conference subject information, conference dial in number, date/time of call, and addressee information. The mobile conferencing system automatically provides the conference details and the call type parameter to the calendar application, the dialer application, or both applications. The dialer application joins the mobile device to a teleconference using the conference details and the call type parameter. Additionally, the dialer application provides an active call graphical user interface that can display the conference details. The active call graphical user interface displays at least part of the conference details (for example, conference subject information, dial in telephone number, etc.). In some embodiments, the active call graphical user interface displays one or more controls specific to a conference hosting system that is hosting the conference system. A conference hosting system can be a mobile bridge, an intermediate conference server (for example a private branch exchange (PBX)), a conference bridge, or a media server.

Mobile conferencing system also automatically updates a call log with conference details associated with a completed conference call and an associated conference icon. The conference icon indicates that the call entry is a conference call, instead of a typical two party call. Additionally, the inclusion of additional conference details (for example, conference subject information) and a conference icon with the call entry make it easier for a user to track time spent.

Figure 1:
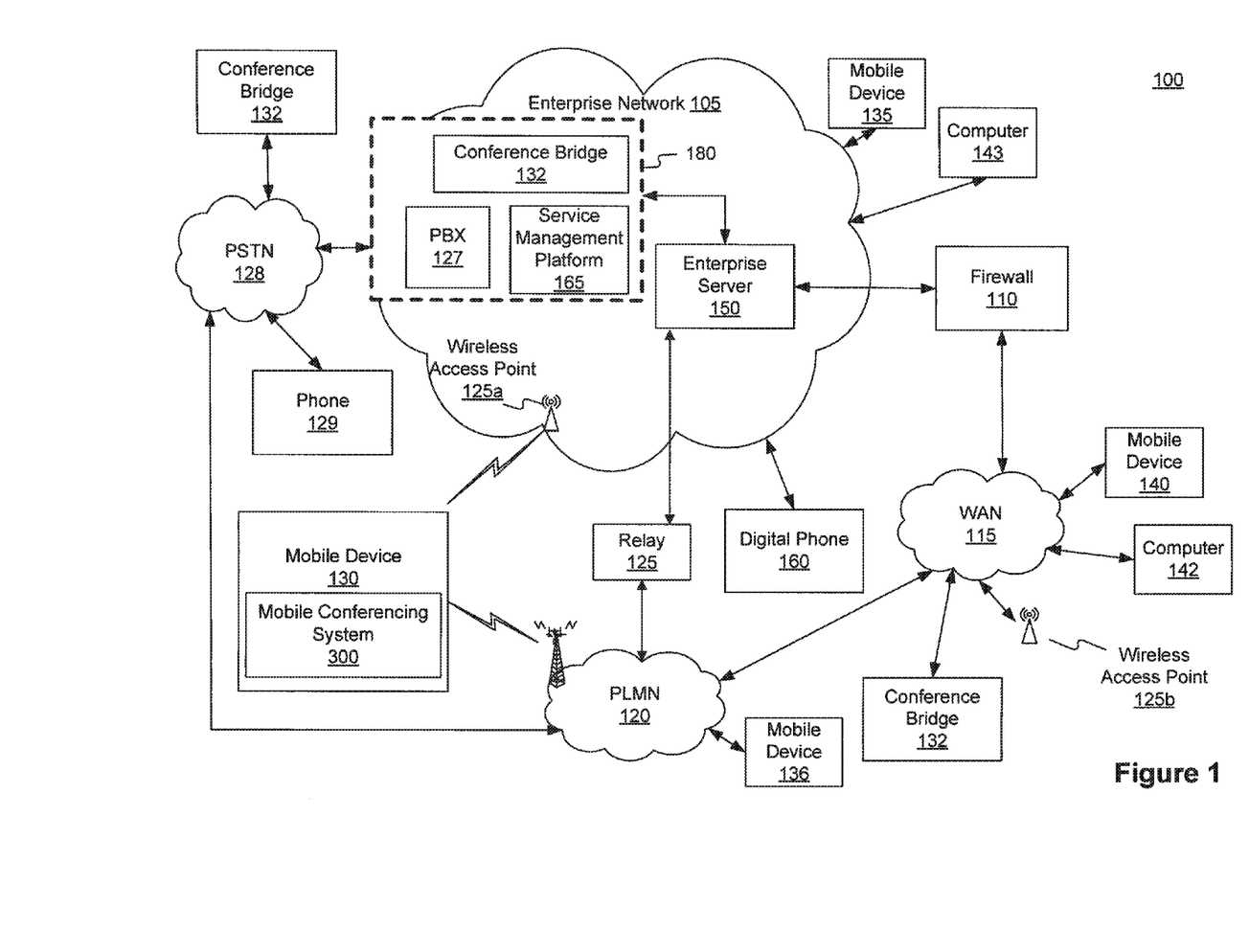
FIG. 1 shows, in block diagram form, an example system utilizing a mobile conferencing system.

Reference is now made to FIG. 1, which shows, in block diagram form, an example system utilizing a mobile conferencing system for enhancing displayed information related to conferences, generally designated 100, for the control and management of communications. System 100 includes an enterprise network 105, which in some embodiments includes a local area network (LAN). In some embodiments, enterprise network 105 can be an enterprise or business system. In some embodiments, enterprise network 105 includes more than one network and is located in multiple geographic areas.

Enterprise network 105 can be coupled, often through a firewall 110, to a wide area network (WAN) 115, such as the Internet. Enterprise network 105 can also be coupled to a public switched telephone network (PSTN) 128 via direct inward dialing (DID) trunks or primary rate interface (PRI) trunks.

Enterprise network 105 can also communicate with a public land mobile network (PLMN) 120, which is also referred to as a wireless wide area network (WWAN) or, in some cases, a cellular network. The coupling with PLMN 120 is via a relay 125, as known in the art.

In some embodiments, enterprise network 105 provides a wireless local area network (WLAN), not shown, featuring wireless access points, such as wireless access point 125a. In some embodiments, other WLANs can exist outside enterprise network 105. For example, a WLAN coupled to WAN 115 can be accessed via wireless access point 125b. WAN 115 is coupled to one or more mobile devices, for example mobile device 140. Additionally, WAN 115 can be coupled to one or more desktop or laptop computers 142 (one shown).

System 100 can include a number of enterprise-associated mobile devices, for example, mobile devices 130, 135, 136, and 140. Mobile devices 130, 135, 136, and 140 can include devices equipped for cellular communication through PLMN 120, mobile devices equipped for communications over one of the WLANs via wireless access points 125a or 125b, or dual-mode devices capable of both cellular and WLAN communications. Wireless access points 125a or 125b can be configured to WLANs that operate in accordance with one of the IEEE 802.11 specifications.

Mobile devices 130, 135, 136, and 140 can be, for example, cellular phones, smartphones, tablets, netbooks, and a PDA (personal digital assistant) enabled for wireless communication. Moreover, mobile devices 130, 135, 136, and 140 can communicate with other components using voice communications or data communications (such as accessing content from a website). Mobile devices 130, 135, 136, and 140 include devices equipped for cellular communication through PLMN 120, devices equipped for Wi-Fi communications via wireless access points 125a or 125b, or dual-mode devices capable of both cellular and WLAN communications. Mobile devices 130, 135, 136, and 140 are described in detail below in FIG. 2.

Mobile devices 130, 135, 136, and 140 also include one or more radio transceivers and associated processing hardware and software to enable wireless communications with PLMN 120, and/or one of the WLANs via wireless access points 125a or 125b. In various embodiments, PLMN 120 and mobile devices 130, 135, 136, and 140 are configured to operate in compliance with any one or more of a number of wireless protocols, including GSM, GPRS, CDMA, EDGE, UMTS, EvDO, HSPA, 3GPP, or a variety of others. It will be appreciated that mobile devices 130, 135, 136, and 140 can roam within HAIN 120 and across PLMNs, in known manner, as their user moves. In some instances, dual-mode mobile devices 130, 135, 136, and 140 and/or enterprise network 105 are configured to facilitate roaming between PLMN 120 and wireless access points 125a or 125b, and are thus capable of seamlessly transferring sessions (such as voice calls) from a coupling with the cellular interface of dual-mode device (i.e., 130, 135, 136, and 140) to a WLAN interface of the dual-mode device, and vice versa.

Each mobile device possesses the ability to act as a mobile bridge. For example, mobile device 130 can act as a mobile bridge with mobile device 136. Generally, a conference call hosted using a mobile bridge will have a maximum of 3 participants. User controls at the mobile-bridge level include adding additional participants, muting the device user, un-muting the device user, and exiting the conference call. Additionally, the moderator can have additional controls not available to other conference users, for example, muting a particular conference participant. The particular user and moderator controls associated with the mobile bridge can vary depending on the type of mobile bridge used. Additionally, the particular user and moderator controls available can vary depending on whether the conference is an audio conference, a video conference, or a combination thereof.

Enterprise network 105 typically includes a number of networked servers, computers, and other devices. For example, enterprise network 105 can couple one or more desktop or laptop computers 143 (one shown). The coupling can be wired or wireless in some embodiments. Enterprise network 105 can also couple to one or more digital telephone phones 160.

Relay 125 serves to route messages received over PLMN 120 from mobile device 130 to corresponding enterprise network 105. Relay 125 also pushes messages from enterprise network 105 to mobile device 130 via PLMN 120.

Enterprise network 105 also includes an enterprise server 150. Together with relay 125, enterprise server 150 functions to redirect or relay incoming e-mail messages addressed to a user's e-mail address through enterprise network 105 to mobile device 130 and to relay incoming e-mail messages composed and sent via mobile device 130 out to the intended recipients within WAN 115 or elsewhere. Enterprise server 150 and relay 125 together facilitate a "push" e-mail service for mobile device 130, enabling the user to send and receive e-mail messages using mobile device 130 as though the user were coupled to an e-mail client within enterprise network 105 using the user's enterprise-related e-mail address, for example on computer 143.

As is typical in many enterprises, enterprise network 105 includes a Private Branch eXchange (although in various embodiments the PBX can be a standard PBX or an IP-PBX, for simplicity the description below uses the term PBX to refer to both) 127 having a coupling with PSTN 128 for routing incoming and outgoing voice calls for the enterprise. PBX 127 is coupled to PSTN 128 via DID trunks or PRI trunks, for example. PBX 127 can use ISDN signaling protocols for setting up and tearing down circuit-switched couplings through PSTN 128 and related signaling and communications. In some embodiments, PBX 127 can be coupled to one or more conventional analog telephones 129. PBX 127 is also coupled to enterprise network 105 and, through it, to telephone terminal devices, such as digital telephone sets 160, softphones operating on computers 143, etc. Within the enterprise, each individual can have an associated extension number, sometimes referred to as a PNP (private numbering plan), or direct dial phone number. Calls outgoing from PBX 127 to PSTN 128 or incoming from PSTN 128 to PBX 127 are typically circuit-switched calls. Within the enterprise, for example, between PBX 127 and terminal devices, voice calls are open packet-switched calls, for example Voice-over-IP (VoIP) calls.

PBX 127 possesses an intermediate conferencing server capability, and generally can host a conference call with a predetermined maximum number of participants, for example 3 to 7 participants. PBX 127 is configured to allow the moderator to possess one or more moderator controls. For example, user controls at the intermediate conference server level include joining a conference call, muting the user, recording the conference call, and un-muting the user. Additionally, the moderator can have additional controls not available to the conference participants, for example, muting a participant, un-muting a participant, and dropping one or more participants. The particular user and moderator controls associated with the intermediate conference server can vary depending on the type of intermediate conference server used. Additionally, the particular user and moderator controls available can vary depending on whether the conference is an audio conference, a video conference, or a combination thereof.

System 100 includes one or more conference bridges 132. Conference bridge 132 can be part of enterprise network 105. Additionally, in some embodiments, conference bridge 132 can be accessed via WAN 115 or PTSN 128.

Conference bridge 132 generally is configured to host conference calls with a maximum number of participants numbering in the 100 s or more (for example, 1000). Conference bridge 132 is configured such that the user possesses a plurality of controls. Conference bridge 132 user controls can include joining a conference call, muting the user, exiting the conference call, creating side conferences, application sharing, raise hand, etc. Additionally, the moderator can have additional controls that are not available to other participants of the conference. For example, muting one or more participants, speaking priority (i.e. when moderator speaks all participants are muted), dropping one or more participants, raising hand, recording the transcript of the conference call, etc. Conferences hosted using conference bridge 132 typically have a larger maximum number of participants and a larger number of moderator controls. The particular user and moderator controls associated with the conference bridge can vary depending on the type of conference bridge used. Additionally, the particular user and moderator controls available can vary depending on whether the conference is an audio conference, a video conference, or a combination thereof.

Enterprise network 105 can further include a Service Management Platform (SMP) 165 for performing some aspects of messaging or session control, like call control and advanced call processing features. Service Management Platform (SMP) can have one or more processors and at least one memory for storing program instructions. The processor(s) can be a single or multiple microprocessors, field programmable gate arrays (FPGAs), or digital signal processors (DSPs) capable of executing particular sets of instructions. Computer-readable instructions can be stored on a tangible non-transitory computer-readable medium, such as a flexible disk, a hard disk, a CD-ROM (compact disk-read only memory), and MO (magneto-optical), a DVD-ROM (digital versatile disk-read only memory), a DVD RAM (digital versatile disk-random access memory), or a semiconductor memory. Alternatively, the methods can be implemented in hardware components or combinations of hardware and software such as, for example, ASICs, special purpose computers, or general purpose computers. SMP 165 is configured to couple different conference systems to create a heterogeneous conference, for example, a single teleconference, where participants can be joined to the conference via a mobile bridge and an intermediate conference server.

Figure 3:
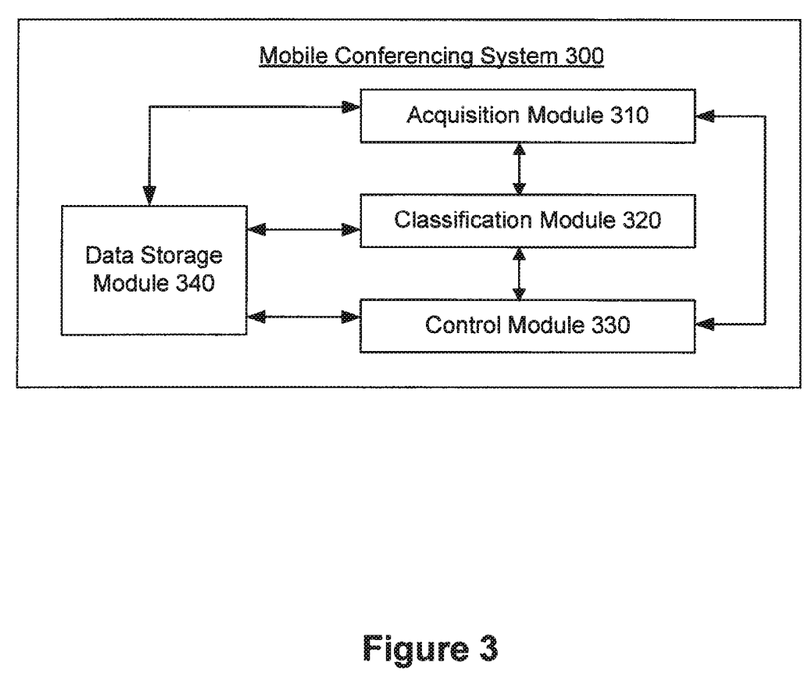
FIG. 3 is a block diagram depicting an example mobile conferencing system for enhancing displayed information related to a teleconference.

Mobile conferencing system 300 can include one or more processors (not shown), a memory (not shown), and a data interface (not shown). The processor(s) can be a single or multiple microprocessors, field programmable gate arrays (FPGAs), or digital signal processors (DSPs) capable of executing particular sets of instructions. Computer-readable instructions can be stored on a tangible non-transitory computer-readable medium, such as a flexible disk, a hard disk, a CD-ROM (compact disk-read only memory), and MO (magneto-optical), a DVD-ROM (digital versatile disk-read only memory), a DVD RAM (digital versatile disk-random access memory), or a semiconductor memory. Alternatively, the methods can be implemented in hardware components or combinations of hardware and software such as, for example, ASICs, special purpose computers, or general purpose computers. Mobile conferencing system 300 can be implemented on a mobile device, a single computer, distributed across a plurality of computers, or some combination thereof.

Figure 2:
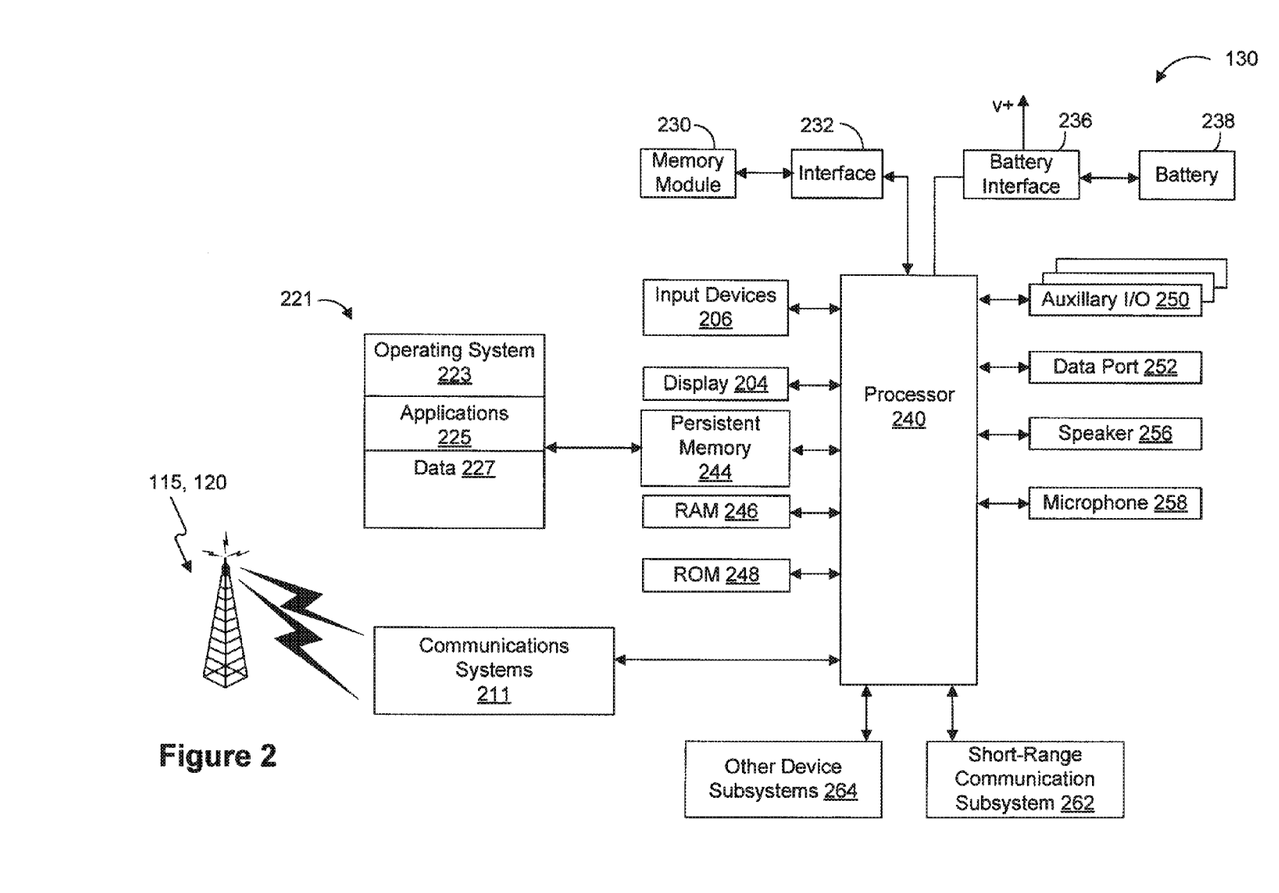
FIG. 2 shows a block diagram illustrating a mobile communication device in accordance with an example embodiment.

Reference is now made to FIG. 2 which illustrates in detail mobile device 130 in which example embodiments can be applied. Note that while FIG. 2 is described in reference to mobile device 130, it also applies to mobile devices 135, 136, and 140. Mobile device 130 is a two-way communication device having data and voice communication capabilities, and the capability to communicate with other computer systems, for example, via the Internet. Depending on the functionality provided by mobile device 130, in various embodiments mobile device 130 can be a handheld device, a multiple-mode communication device configured for both data and voice communication, a smartphone, a mobile telephone, a tablet, or a PDA (personal digital assistant) enabled for wireless communication.

Mobile device 130 includes a rigid case (not shown) housing the components of mobile device 130. The internal components of mobile device 130 can, for example, be constructed on a printed circuit board (PCB). The description of mobile device 130 herein mentions a number of specific components and subsystems. Although these components and subsystems can be realized as discrete elements, the functions of the components and subsystems can also be realized by integrating, combining, or packaging one or more elements in any suitable fashion.

Mobile device 130 includes a controller comprising at least one processor 240 (such as a microprocessor), which controls the overall operation of mobile device 130. Processor 240 interacts with device subsystems such as communication systems 211 for exchanging radio frequency signals with the wireless network (for example WAN 115 and/or PLMN 120) to perform communication functions. Processor 240 interacts with additional device subsystems including a display 204 such as a liquid crystal display (LCD) screen or any other appropriate display, input devices 206 such as a keyboard and control buttons, persistent memory 241, random access memory (RAM) 246, read only memory (ROM) 248, auxiliary input/output (110) subsystems 250, data port 252 such as a conventional serial data port or a Universal Serial Bus (USB) data port, speaker 256, microphone 258, short-range communication subsystem 262 (which can employ any appropriate wireless (for example, RF), optical, or other short range communications technology), and other device subsystems generally designated as 264. Some of the subsystems shown in FIG. 2 perform communication-related functions, whereas other subsystems can provide "resident" or on-device functions.

Display 204 can be realized as a touch-screen display in some embodiments. The touch-screen display can be constructed using a touch-sensitive input surface coupled to an electronic controller and which overlays the visible element of display 204. The touch-sensitive overlay and the electronic controller provide a touch-sensitive input device and processor 240 interacts with the touch-sensitive overlay via the electronic controller.

Communication systems 211 include one or more communication systems for communicating with wireless WAN 115 and wireless access points 125a and 125b within the wireless network. The particular design of communication systems 211 depends on the wireless network in which mobile device 130 is intended to operate. Mobile device 130 can send and receive communication signals over the wireless network after the required network registration or activation procedures have been completed.

Processor 240 operates under stored program control and executes software modules 221 stored in memory such as persistent memory 244 or ROM 248. Processor 240 can execute code means or instructions. ROM 248 can contain data, program instructions or both. Persistent memory 244 can contain data, program instructions, or both. In some embodiments, persistent memory 244 is rewritable under control of processor 240, and can be realized using any appropriate persistent memory technology, including EEPROM, EAROM, FLASH, and the like. As illustrated in FIG. 2, software modules 221 can include operating system software 223. Additionally, software modules 221 can include software applications 225.

In some embodiments, persistent memory 244 stores user-profile information, including, one or more conference dial-in telephone numbers. Persistent memory 244 can additionally store identifiers related to particular conferences. Persistent memory 244 can also store information relating to various people, for example, name of a user, a user's identifier (user name, email address, or any other identifier), place of employment, work phone number, home address, etc. Additionally, persistent memory 244 can additionally store conference details parsed from one or more calendar events. Conference details can include, for example, conference subject information, conference dial in number, date/time of call, and addressee information. In some embodiments, persistent memory 244 can store a look up table that mobile conferencing system 300 can reference to determine what user controls are associated with a particular conference dial in number.

Software modules 221, for example, mobile conferencing system 300, or parts thereof can be temporarily loaded into volatile memory such as RAM 246. RAM 246 is used for storing runtime data variables and other types of data or information. In some embodiments, different assignment of functions to the types of memory could also be used.

Software applications 225 can further include a range of applications, including, for example, an application related to mobile conferencing system 300, an e-mail messaging application, an address book, a calendar application, a dialer application, a notepad application, an Internet browser application, a voice communication (i.e., telephony) application, a mapping application, or a media player application, or any combination thereof. Each of software applications 225 can include layout information defining the placement of particular fields and graphic elements (for example, text fields, input fields, icons, etc.) in the user interface (i.e., display 204) according to the application.

In some embodiments, auxiliary input/output (I/O) subsystems 250 comprise an external communication link or interface, for example, an Ethernet connection. In some embodiments, auxiliary I/O subsystems 250 can further comprise one or more input devices, including a pointing or navigational tool, or one or more output devices, including a mechanical transducer such as a vibrator for providing vibratory notifications in response to various events on mobile device 130 (for example, receipt of an electronic message or incoming phone call), or for other purposes such as haptic feedback (touch feedback).

In some embodiments, mobile device 130 also includes one or more removable memory modules 230 (typically comprising FLASH memory) and one or more memory module interfaces 232. Among possible functions of removable memory module 230 is to store information to augment interoperability between device control system 400 and different types of conference hosting systems. For example, memory modules 230 can contain one or more command translation programs. Another possible function of removable memory module 230 is to store information used to identify or authenticate a user or the user's account to wireless network (for example WAN 115 and/or PLMN 120). For example, in conjunction with certain types of wireless networks, including GSM and successor networks, removable memory module 230 is referred to as a Subscriber Identity Module or SIM. Memory module 230 is inserted in or coupled to memory module interface 232 of mobile device 130 in order to operate in conjunction with the wireless network.

Mobile device 130 stores data 227 in persistent memory 244. In various embodiments, data 227 includes service data comprising information required by mobile device 130 to establish and maintain communication with the wireless network (for example WAN 115 and/or PLMN 120). Data 227 can also include, for example, scheduling and connection information for connecting to a scheduled call. Data 227 can include device control system data used by mobile device 130 for various tasks. For example, to automatically dial a conference, to identify user controls associated with a particular conference hosting system, to classify a call type parameter, to execute user controls (for example, add participants to a conference call, etc.), to provide moderator control over a conference call to mobile device 130 when mobile device 130 acts as a moderator device, to provide one or more controls to a user of mobile device 130 when participating in a conference call, to provide conference details to the calendaring application, to provide conference details to the dialer application, etc.

Mobile device 130 also includes a battery 238 which furnishes energy for operating mobile device 130. Battery 238 can be coupled to the electrical circuitry of mobile device 130 through a battery interface 236, which can manage such functions as charging battery 238 from an external power source (not shown) and the distribution of energy to various loads within or coupled to mobile device 130. Short-range communication subsystem 262 is an additional optional component which provides for communication between mobile device 130 and different systems or devices, which need not necessarily be similar devices. For example, short-range communication subsystem 262 can include an infrared device and associated circuits and components, or a wireless bus protocol compliant communication mechanism such as a BLUETOOTH communication module to provide for communication with similarly-enabled systems and devices.

A predetermined set of applications that control basic device operations, including data and possibly voice communication applications can be installed on mobile device 130 during or after manufacture. Additional applications and/or upgrades to operating system software 223 or software applications 225 can also be loaded onto mobile device 130 through the wireless network (for example WAN 115 and/or NAN 120), auxiliary I/O subsystem 250, data port 252, short-range communication subsystem 262, or other suitable subsystem such as 264. The downloaded programs or code modules can be permanently installed, for example, written into the program memory (for example persistent memory 244), or written into and executed from RAM 246 for execution by processor 240 at runtime.

Mobile device 130 can provide three principal modes of communication: a data communication mode, a voice communication mode, and a video communication mode. In the data communication mode, a received data signal such as a text message, an e-mail message, Web page download, or an image file are processed by communication systems 211 and input to processor 240 for further processing. For example, a downloaded Web page can be further processed by a browser application, or an e-mail message can be processed by an e-mail message messaging application and output to display 204. A user of mobile device 130 can also compose data items, such as e-mail messages, for example, using the input devices in conjunction with display 204. These composed items can be transmitted through communication systems 211 over the wireless network (for example WAN 115 and/or PLMN 120). In the voice communication mode, mobile device 130 provides telephony functions and operates as a typical cellular phone. In the video communication mode, mobile device 130 provides video telephony functions and operates as a video teleconference term. In the video communication mode, mobile device 130 utilizes one or more cameras (not shown) to capture video of video teleconference. Additionally, in some embodiments, mobile device 130 utilizes the one or more cameras to capture video. The video can be stored as one or more video data files in persistent memory 244, RAM 248, memory module 230, or any other data storage medium.

Referring back to FIG. 1, collectively SMP 165, conference bridge 132, and PBX 127 is referred to as the enterprise communications platform, generally designated 180. It will be appreciated that enterprise communications platform 180 and, in particular, SMP 165, is implemented on one or more servers having suitable communications interfaces for coupling to and communicating with PBX 127, conference bridge 132 and DID/PRI trunks. Although SMP 165 can be implemented on a stand-alone server, it will be appreciated that it can be implemented into an existing control agent/server as a logical software component.

Mobile device 130 includes mobile conferencing system 300 and is in communication with enterprise network 105. In some example embodiments, mobile conferencing system 300 also operates on mobile devices 135, 136, and 140, computers 142 and 143, digital phone 160, or any variation thereof. In some embodiments, mobile conferencing system 300 is in communication with and operates as part of a conference call program installed on mobile devices 130, 135, 136, and 140, and other servers on enterprise network 105, for example, SMP 165. Additionally, in some embodiments, mobile conferencing system 300 is integral to the conference call program. Mobile conferencing system 300 interfaces with a calendaring application (not shown) and a dialer application (not shown). The calendaring and dialer application operate, at least in part, on mobile device 130. In some embodiments, mobile conferencing system 300 is integral to one or both of the calendaring application and the dialer application.

FIG. 3 is a block diagram depicting example mobile conferencing system 300. As illustrated, mobile conferencing system 300 includes an acquisition module 310, a classification module 320, a control module 330, and a data storage module 340. It is appreciated that one or more of these modules can be deleted, modified, or combined together with other modules.

Acquisition module 310 interfaces with a calendaring application to parse information from a calendar event scheduled within a calendaring application. Acquisition module 310 can be automatically executed when, for example, a user accepts a calendar invitation, the user enters a new calendar event, and the user updates an existing calendar event. Acquisition module 310 is configured to automatically parse the calendar event for conference details including, for example, dialing details, subject matter information, conference scheduling information, and calendar invitation addressee information. Dialing details include conference dial-in phone number, participant passcode, extension, moderator passcode, etc. Conference scheduling information includes the date and time of the conference. Acquisition module 310 can be coupled to classification module 320, control module 330, and data storage module 340.

Classification module 320, analyzes the parsed information to determine if conference call details are present in the parsed information. For example, classification module can be configured to analyze the parsed information for keywords and phrases like "teleconference," "conference," "phone conference," "John Doe has invited you to join the conference," etc. Additionally, classification module 320 can be further configured to analyze the parsed information for conference dial in phone numbers, extensions to the conference dial in phone numbers, conference passcodes, and moderator passcodes. Classification module 320 makes a determination based on the analyzed information whether the parsed information contains conference call details. For example, classification module 320 can be configured to match phone numbers parsed from the calendar event against numbers stored in data storage module 340 to determine if the phone numbers are conference dial in phone numbers. Additionally, in some embodiments, classification module 320 can be configured to analyze the number of addressees on the calendar invitation that created the calendar event. Classification module 320 is also configured to analyze information directly dialed by the user of mobile device 130 for conference dial in phone numbers, extensions to the conference dial in phone numbers, conference passcodes, and moderator passcodes. Classification module 320 makes a determination based on the analyzed information whether the direct dial in information contains conference call details. If classification module 320 determines conference details are present, mobile conferencing system 300 sets a call type parameter associated with the calendar event as being a "conference call." Additionally, classification module 320 then stores the conference details, using for example, data storage module 340. If no conference details are present, mobile conferencing system 300 stops processing the parsed information. Classification module 320 can be coupled to acquisition module 310, control module 330, and data storage module 340.

Control module 330 monitors the calendaring application for the arrival of the date/time associated with the calendar event. In some embodiments, control module 330 is configured to provide at a predetermined time (for example, 15 minutes prior to conference) the conference details to the calendaring application. The mobile device prompts the user at the predetermined time to enter the conference at the scheduled conference time. The prompt can be an audio prompt, or a visual prompt (for example, a join now button), or both, all of which requesting an input to accept or decline joining the conference at the scheduled time. Additionally, the prompt can display information from the conference details, for example, the conference subject information and conference dial in phone number. When the join now button is selected, a join conference command is generated by control module 330, the dialer application, the calendaring application, or some combination thereof. In some embodiments, the join conference command can also be generated via a voice command.

Control module 330 is configured to provide the stored conference details to a dialer application along with the call type parameter. For example, control module 330 can provide a stored conference dial in phone number, participant passcode, moderator passcode, or some combination thereof, to the dialer application. The dialer application can then use the received conference details to automatically dial into the conference or establish a new conference. In some embodiments, the dialer application is configured to dial into a conference using voice commands, specifically a calling name, from the user. In particular, the dialer application can be configured to use the conference subject information as the calling name.

In some embodiments, the dialer application is executed by the execution of a "join now" button on a prompt provided by the calendaring application. The dialer application is separate from mobile conferencing system 300. Additionally, in some embodiments (not shown), the dialer application can be part of mobile conference system 300 (for example, control module 330).

Figure 4A:
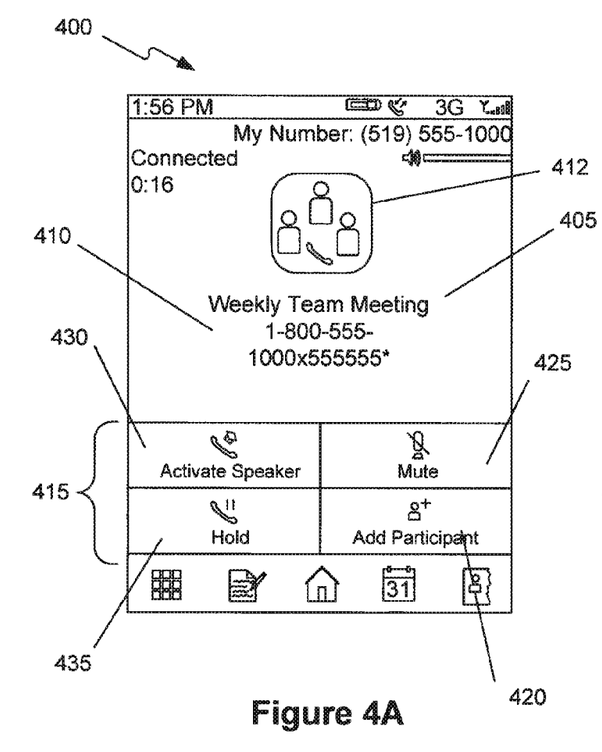
FIG. 4A illustrates an example active control graphical user interface.

The dialer application generates an active call graphical user interface for the duration of the conference call. Mobile device 130 is configured to display conference details on the active call graphical user interface. For example, active call window graphical user interface can display the subject information of the teleconference and the conference dial in number. FIG. 4A illustrates an example active call graphical user interface (GUI) 400 generated by the dialer application. Active call GUI 400 populates the received conference subject information in a conference subject information field 405 and the received conference dial in number in the conference dial in number field 410. Active call GUI 400 can include one or more controls 415, for example add participant 420, mute/unmute 425, activate speaker 430, and hold 435. Additionally, in some embodiments, the stored conference details do not include subject matter information. In this embodiment, active call GUI 400 can be configured to display an identifier associated with the user of the mobile device. The identifier can include, for example, the name of the user, a user ID associated with the user, etc. Additionally, in some embodiments, active call GUI 400 displays a call icon 412. Call icon 412 is indicative of the call being a conference call (for example, call type parameter is "conference call"). For example, call icon 412 can depict multiple parties, multiple phones, some combination thereof, etc.

Figure 4B:
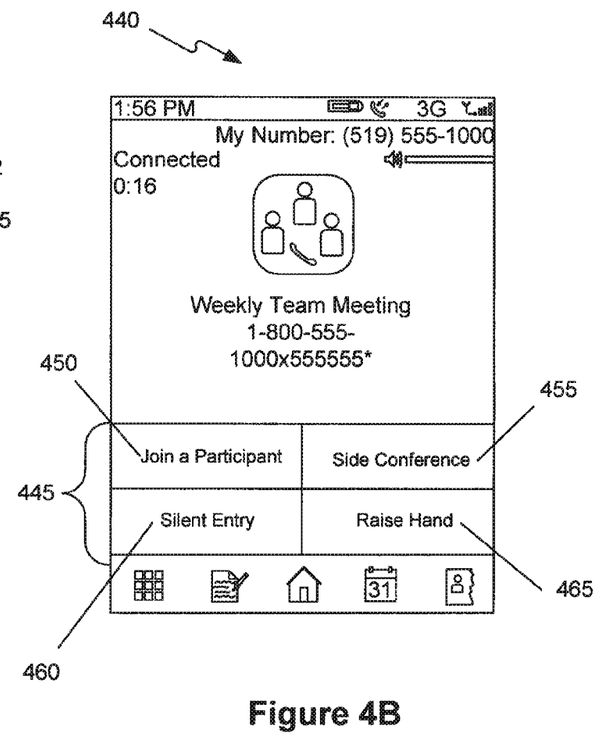
FIG. 4B illustrates an example active control graphical user interface including controls specific to a conference hosting system hosting the conference.

In some embodiments, the dialer application analyzes the received call type parameter to determine one or more controls 430. For example, one or more controls 430 display controls associated with a typical phone call, however, if the call parameter type is "conference call," one or more controls 430 can include controls specific to the conference hosting system (for example, intermediate conference server, conference bridge, etc.) hosting the conference. For example, if mobile device 130 is accessing the conference via a conference bridge, one or more controls 430 can include one or more controls specific to the conference bridge. Similarly, if mobile device 130 is accessing the conference via an intermediate conference server (for example, a PBX), one or more controls include controls specific to the intermediate conference server. FIG. 4B illustrates an example active call graphical user interface (GUI) 440 generated by the dialer application with some user controls specific to a conference bridge. For example, one or more controls 445 can include join a participant 450, side conference 455, silent entry 460, raise hand 465, etc. The displayed controls that are specific to the conference call are determined based on the conference hosting system that is hosting the conference. Additionally, if the user is a moderator (not shown) of the conference, one or more controls 445 can include moderator controls specific to the conference hosting system associated with the conference, for example, priority mute. Control module 330 can be configured to determine if the user is the moderator by analyzing the conference details. For example, if the conference details include a moderator passcode, control module 330 can automatically determine that the user is the moderator. Additionally, control module 330 can automatically determine who the conference moderator is by analyzing the conference details for parsed phrases like, for example, "John Doe has invited you to join the conference." The above listing of controls is not inclusive, and can include other controls not listed. Additionally, the particular user controls available can vary depending on whether the conference is an audio conference, a video conference, or a combination thereof.

Figure 5:
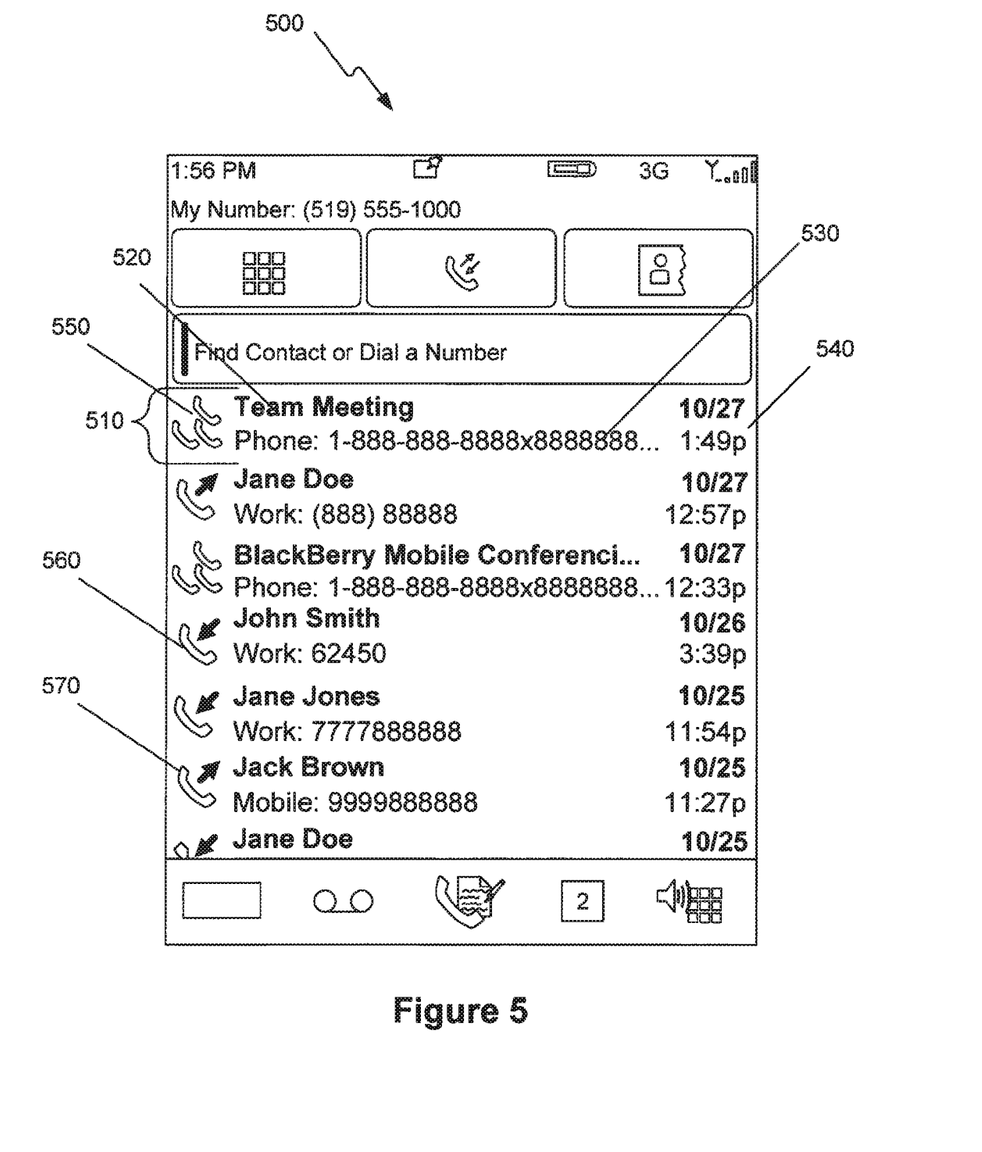
FIG. 5 illustrates an example call log graphical user interface.

Control module 330 is configured to update the call log. After completion of the conference call, a new call entry is automatically added to the call log associated with mobile device 130. The call entry is automatically populated with one or more conference details associated with the completed conference call. Conference details can include, for example, conference subject information, conference dial in number, date/time of call, etc. FIG. 5 illustrates an example call log graphical user interface (GUI) 500. After a conference call is completed, call entry 510 is added to call log GUI 500. Completed call entry 510 includes conference subject information 520, conference dial in number 530, date/time of call 540, and conference icon 550. In some embodiments not shown, call entry 510 can also include an access code. Conference icon 550 provides the user with an easy way to clearly see that a particular call entry is a conference call relative to other non-conference call entries in the call log. Additionally, conference subject information 520 can be converted to a contact name via a menu command (not shown) without the user having to manually enter the data. The inclusion of conference icon 550 and conference subject information 520 are included to make it easier to track how a user spends his time. Control module 330 analyzes the call type parameter to determine whether a call entry should be associated with conference icon 550 or some other icon. If the call type parameter is a "conference call," then the completed call entry is associated with conference icon 550. In this embodiment, conference icon 550 includes three phone icons, however, this should not be construed as limiting conference icon 550 to these particular graphics. In general, conference icon 550 depicts that call entry 510 was a conference call. In contrast, icons 560 and 570 depict typical two party calls.

Additionally, mobile conferencing system 300 can provide a menu item such as "Add to Conference Profiles" specific to call entries where the call type parameter is classified as a "conference call" (for example, call entry 510). Mobile conferencing system 300 can then cross reference and assemble data from both call entry 510 (for example, conference subject information 520, conference dial in number 530 and associated passcode) and an associated calendar event (for example, additional access codes, additional dial in numbers, and an invitee list) to create a conference profile. By referencing the calendared event, mobile conferencing system 300 can classify the retrieved access codes as being a passcode for a moderator or a participant.

Referring back to FIG. 3, data storage module 340 can also include a database, one or more computer files in a directory structure, or any other appropriate data storage mechanism such as a memory. Data storage module 340 stores, for example, conference details from one or more calendar events, user profile information, information relating to various people, and controls specific to different types of conference hosting systems and an associated controls lookup table. Parsed information can include, for example, conference dialing details, subject matter information, conference scheduling information, and calendar invitation addressee information. User profile information can include, for example, one or more conference dial in telephone numbers. Information relating to various people can include, for example, name, place of employment, work phone number, home address, etc. Data storage module 340 can include controls specific to particular types of conference hosting systems. Additionally, data storage module 340 can include a controls lookup table, which mobile conferencing system 300 can use to determine what type of conference controls are available based on the conference dial in number. In some example embodiments, data storage module 340 is distributed across one or more network servers. Data storage module 340 can communicate with acquisition module 310, classification module 320, and control module 330.

Each of modules 310, 320, 330, and 340 can be software programs stored in a RAM, a ROM, a PROM, a FPROM, or other dynamic storage devices, or persistent memory for storing information and instructions.

Figure 6:
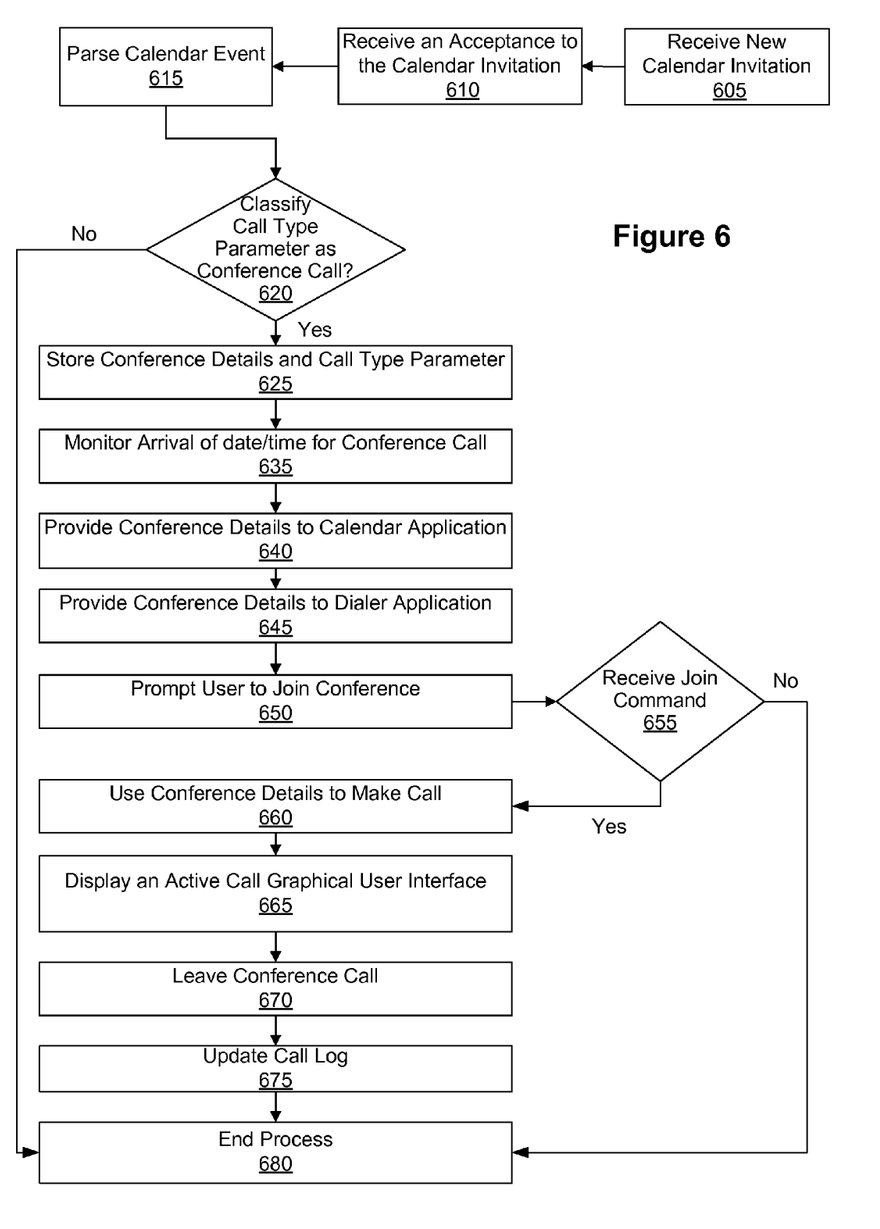
FIG. 6 shows a flowchart representing an example method performed on a mobile device for presenting a user interface and facilitating conference calls.

FIG. 6 is a flowchart representing an example method performed on a mobile device for presenting a user interface and facilitating conference calls. The mobile device includes a calendaring application, a dialer application, and a mobile conferencing system. While the flowchart discloses the following steps in a particular order, it is appreciated that at least some of the steps can be moved, modified, or deleted where appropriate.

In step 605, a mobile device receives a calendar invitation. In some embodiments, the calendar invitation is sent by an organizer of the invitation via an organizer device. In other embodiments, a user of the mobile device creates or modifies a calendar invitation. In some embodiments, the user is also the moderator of the conference. In step 610, the mobile device receives as input an acceptance to the calendar invitation that is scheduled as a calendar event using the calendaring application.

In step 615, the mobile conferencing system parses the calendar event for conference details. Conference details include, for example, dialing details, subject matter information, conference scheduling information, and addressee information of the conference invitation. Dialing details include conference dial-in phone number, participant passcode, extension, moderator passcode, etc. Subject matter information includes information associated with the subject of the calendar event. Conference scheduling information includes the date and time of the conference.

In step 620, the mobile conferencing system determines whether enough conference details are present in the parsed information to classify a call type parameter associated with the calendared event as a "conference call." For example, the mobile conferencing system analyzes the parsed information for keywords and phrases (for example, "teleconference," "conference," "phone conference," "John Doe has invited you to join the conference," etc.), conference dial in phone numbers, extensions, and passcodes. The mobile conferencing system makes a determination based on the analyzed information whether the parsed information contains conference call details. For example, the mobile conferencing system can be configured to match phone numbers parsed from the calendar event against numbers stored in memory to determine if the phone number is a conference dial in phone number. Additionally, in some embodiments, the mobile conferencing system analyzes the number of addressees on the calendar invitation which created the calendar event. In some embodiments, not shown, the mobile conferencing system analyzes information directly dialed by the user of the mobile device for conference dial in phone numbers, extensions to the conference dial in phone numbers, conference passcodes, and moderator passcodes. The mobile conferencing system makes a determination based on the analyzed information whether the direct dial in information contains conference call details. If the mobile conferencing system determines conference details are present, the mobile conferencing system sets a call type parameter associated with the calendar event as being a "conference call" and stores (step 625) the conference details and the call type parameter. Alternatively, if the mobile conferencing system determines that no conference details are present, or that not enough conference details are present, the mobile conferencing system ends the process (step 680).

After the conference details and call type parameters are stored, the mobile conferencing system then monitors (step 635) the calendaring application for the arrival of a date/time associated with the conference call.

In step 640, at a predetermined time the mobile conferencing system provides the conference details to the calendaring application. Additionally, at the predetermined time, or some other time, the mobile conferencing system provides the stored conference details to the dialer application (step 645).

In step 650, the mobile device prompts the user at the predetermined time to join the conference at the scheduled conference time. The prompt can be an audio prompt, or a visual prompt (for example, a join now button), or both, all of which requesting an input to accept or decline joining the conference at the scheduled time. Additionally, the prompt can display information from the received conference details. For example, the prompt can display the subject of the conference call, the conference dial in number, etc. The predetermined time can be a time determined by the organizer, for example, the invitee device produces a prompt one minute before the conference is scheduled to begin. Additionally, in some embodiments, the predetermined time is set by the calendaring application on the user's mobile device. In step 655, the mobile device receives a join conference command. For example, the mobile device can generate the join conference command in response to a user selecting a join now button, a voice command to dial into the conference, etc. If the mobile device does not receive a command to join the conference, the process ends (step 680).

In step 660 the mobile device uses the conference details to enter the conference call. The dialer application of the mobile device automatically dials into the conference based on the received conference details (e.g., conference dial in number and associated passcode). In other embodiments not shown, the invitee manually dials into the conference based on the dialing details of the conference. For example, if the received conference details do not include a conference dial in number, the mobile device can prompt the user to enter the conference number at the appropriate time. Additionally, in some embodiments, a user may dial into a conference using voice commands (for example, the calling name can be the conference subject information). Additionally, in some embodiments not shown the dialer application is executed by the execution of a "join now" button on a prompt provided by the calendaring application.

In step 665 the mobile device displays an active call graphical user interface (GUI) using the conference details and the call type parameter. The active call GUI includes a conference subject information field and a conference dial in number field. In some embodiments, the active call GUI populates these files with the conference details. Additionally, the active call GUI includes one or more controls, for example add participant, mute/unmute, activate speaker, and hold. Additionally, the stored conference details do not include subject matter information. In this embodiment, the active call GUI displays an identifier associated with the user of the mobile device. The identifier can include, for example, the name of the user, a user ID associated with the user, etc. Additionally, in some embodiments the active call GUI displays a call icon. The call icon is indicative of the call being a conference call (for example, call type parameter is "conference call"). For example, call icon can depict multiple parties, multiple phones, some combination thereof, etc.

In some embodiments, because the call type parameter is "conference call," the active call GUI can include one or more user controls specific to the conference hosting system (for example, intermediate conference bridge, conference bridge, etc.). The mobile conferencing system references a controls lookup table to determine what type of conference controls are available based on the conference dial in number. For example, if the mobile device is accessing the conference via a conference bridge at conference dial in number 1-800-123-4567, the mobile conferencing system would reference the conference dial in number on the look up table to determine the one or more controls specific to the conference bridge associated with the 1-800-123-4567 conference dial in number (for example, join a participant, side conference, silent entry, raise hand, etc.). Additionally, if the user is a moderator (not shown) of the conference, one or more controls can include moderator controls specific to the conference hosting system associated with the conference, for example, priority mute. Mobile conferencing system determines if the user is a moderator by analyzing the conference details. For example, if the conference details include a moderator passcode, mobile conferencing system can automatically determine that the user is the moderator. Additionally, the mobile conferencing system can automatically determine who the conference moderator is by analyzing the conference details for parsed phrases like, for example, "John Doe has invited you to join the conference." Additionally, the particular user controls available can vary depending on whether the conference is an audio conference, a video conference, or a combination thereof.

In step 670, the mobile device leaves the conference. After completion of the conference call, mobile conferencing system creates a new call entry that is automatically added to the call log (step 675). The call entry is automatically populated with one or more conference details associated with the completed conference call. Conference details can include, for example, conference subject information, conference dial in number, date/time of call, etc. Additionally, the mobile conferencing system analyzes the call type parameter to determine whether the call entry should be associated with a conference icon or some other icon indicative of another type of call (for example, typical two party call). If the call type parameter is a "conference call," then the call entry is associated with a conference icon. After the call log is updated the process ends (step 680).

Certain adaptations and modifications of the described embodiments can be made. Therefore, the above discussed embodiments are considered to be illustrative and not restrictive.

Embodiments of the present application are not limited to any particular operating system, mobile device architecture, server architecture, or computer programming language.

What is claimed is:

1. A method performed by a mobile device for joining the mobile device to a conference call, the method comprising:
    parsing a scheduled calendar event record stored in the mobile device for conference details, wherein the conference details include dialing details and scheduling information of the scheduled calendar event;
    classifying a call type parameter associated with the scheduled calendar event as a conference call based on the parsed conference details;
    monitoring for an indication of an arrival of a predetermined time associated with the conference call based on the parsed conference details;
    responsive to the indication, joining the mobile device to the conference call using the parsed conference details and the call type parameter; and
    displaying an active call graphical user interface, wherein the graphical user interface displays at least part of the conference details.

2. The method of claim 1, wherein the conference details further include subject matter information.

3. The method of claim 2, wherein joining the mobile device to the conference call using the parsed conference details and the call type parameter includes:
    automatically dialing into the conference based on a voice command including the conference subject information.

4. The method of claim 2, wherein the active call graphical user interface displays the subject matter information.

5. The method of claim 1, wherein the active call graphical user interface displays one or more user controls specific to a conference hosting system hosting the conference call.

6. The method of claim 5, wherein the types of conference hosting systems are selected from the group consisting of a mobile bridge, an intermediate conference server, and a conference bridge.

7. The method of claim 1, further comprising:
    creating a call entry in a call log when the mobile device leaves the conference call; and
    displaying a conference icon, based on the call type parameter, that is associated with the call.

8. A mobile device comprising:
    one or more processors configured to execute modules; and
    a memory storing the modules, the modules comprising:
        an acquisition module configured to parse a scheduled calendar event record stored in the mobile device for conference details, wherein the conference details include dialing details and scheduling information of the scheduled calendar event;
        a classification module configured to classify a call type parameter associated with the scheduled calendar event as a conference call based on the parsed conference details; and
        a control module configured to:
            monitor for an indication of an arrival of a predetermined time associated with the conference call based on the parsed conference details;
            responsive to the indication, assist the mobile device with joining the conference call using the parsed conference details and the call type parameter; and
            assist the mobile device with displaying an active call graphical user interface, wherein the graphical user interface displays at least part of the conference details.

9. The mobile device of claim 8, wherein the conference details further include subject matter information.

10. The mobile device of claim 9, wherein the active call graphical user interface displays the subject matter information.

11. The mobile device of claim 8, wherein the active call graphical user interface displays one or more user controls specific to a conference hosting system hosting the conference call.

12. The mobile device of claim 11, wherein the types of conference hosting systems are selected from the group consisting of a mobile bridge, an intermediate conference server, and a conference bridge.

13. The mobile device of claim 8, wherein the control module is further configured to:
    create a call entry in a call log when the mobile device leaves the conference call; and assist the mobile device with displaying a conference icon, based on the call type parameter, that is associated with the call.

14. A non-transitory computer-readable medium comprising instructions that are executable by one or more processors of a mobile device, to cause the mobile device to perform a method, the method comprising:
    parsing a scheduled calendar event record stored in the mobile device for conference details, wherein the conference details include dialing details and scheduling information of the scheduled calendar event;
    classifying a call type parameter associated with the scheduled calendar event as a conference call based on the parsed conference details;
    monitoring for an indication of an arrival of a predetermined time associated with the conference call based on the parsed conference details;
    responsive to the indication, facilitating the mobile device to join the conference call using the parsed conference details and the call type parameter; and
    facilitating display of an active call graphical user interface, wherein the graphical user interface displays at least part of the conference details.

15. The computer readable medium of claim 14, wherein the conference details further include subject matter information.

16. The computer readable medium of claim 15, wherein facilitating the mobile device to join the conference call using the parsed conference details and the call type parameter includes:
   automatically dialing into the conference based on a voice command including the conference subject information.

17. The computer readable medium of claim 15, wherein the active call graphical user interface displays the subject matter information.

18. The computer readable medium of claim 14, wherein the active call graphical user interface displays one or more user controls specific to a conference hosting system hosting the conference call.

19. The computer readable medium of claim 18, wherein the types of conference hosting systems are selected from the group consisting of a mobile bridge, an intermediate conference server, and a conference bridge.

20. The computer readable medium of claim 14, further comprising:
   creating a call entry in a call log when the mobile device leaves the conference call; and
   facilitating display of a conference icon, based on the call type parameter, that is associated with the call.

* * * * *